(12) United States Patent
Kakadia et al.

(10) Patent No.: US 9,444,683 B2
(45) Date of Patent: Sep. 13, 2016

(54) TRAFFIC MEASUREMENT SYSTEM FOR WIRELESS SERVICE PROVIDERS

(71) Applicants: Verizon Patent and Licensing Inc., Basking Ridge, NJ (US); Cellco Partnership, Basking Ridge, NJ (US)

(72) Inventors: Deepak Kakadia, Union City, CA (US); Michael S. Gorman, Concord, NC (US); Brian S. Couture, Baltic, CT (US); Donna L. Polehn, Kirkland, WA (US); Richard N. Lerner, Orinda, CA (US); Trung T. Quach, Surprise, AZ (US); Robert P. Faber, Jr., Aurora, CO (US); Janbec Chataw, Haledon, NJ (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 200 days.

(21) Appl. No.: 13/946,677

(22) Filed: Jul. 19, 2013

(65) Prior Publication Data

US 2015/0023170 A1    Jan. 22, 2015

(51) Int. Cl.
| | | |
|---|---|---|
| *H04L 12/24* | (2006.01) | |
| *H04L 12/26* | (2006.01) | |
| *H04W 24/00* | (2009.01) | |
| *H04W 24/08* | (2009.01) | |
| *H04W 24/02* | (2009.01) | |

(52) U.S. Cl.
CPC ........... *H04L 41/0823* (2013.01); *H04L 43/08* (2013.01); *H04L 43/062* (2013.01); *H04L 43/087* (2013.01); *H04L 43/0829* (2013.01); *H04L 43/0852* (2013.01); *H04L 43/106* (2013.01)

(58) Field of Classification Search
CPC ... H04W 24/00; H04W 24/02; H04W 24/04; H04W 24/08; H04W 24/10; H04L 43/12; H04L 43/026; H04L 43/08; H04L 43/16; H04L 43/106; H04L 43/062; H04L 43/0823; H04L 43/0829; H04L 43/0813; H04L 41/0823; H04L 43/06; H04L 43/067; H04L 43/087

See application file for complete search history.

(56) References Cited

U.S. PATENT DOCUMENTS

| | | | | |
|---|---|---|---|---|
| 6,836,466 | B1 * | 12/2004 | Kant et al. | 370/252 |
| 8,095,640 | B2 * | 1/2012 | Guingo et al. | 709/224 |
| 8,761,012 | B2 * | 6/2014 | Yamada | H04L 47/17 370/231 |
| 2003/0214913 | A1 * | 11/2003 | Kan et al. | 370/252 |
| 2012/0236750 | A1 * | 9/2012 | Bugenhagen et al. | 370/252 |
| 2013/0064096 | A1 * | 3/2013 | Degioanni et al. | 370/241 |
| 2013/0304915 | A1 * | 11/2013 | Kawai | 709/224 |
| 2013/0322249 | A1 * | 12/2013 | Heinz et al. | 370/235 |

* cited by examiner

*Primary Examiner* — Ahmed Elallam

(57) ABSTRACT

A device receives packet information associated with a traffic flow and a network segment. The network segment includes a portion of a network via which the traffic flow is transmitted. The device associates the received packet information with a period of time. The device determines that the period of time has expired, and aggregates the received packet information based on determining that the period of time has expired. The device determines a network performance parameter associated with the traffic flow over the network segment based on the aggregated packet information. The device generates performance information that identifies the network performance parameter, the traffic flow, and the network segment. The device provides the performance information.

20 Claims, 13 Drawing Sheets

| Segment ID 510 | Flow ID 520 | Latency (ms) 530 | Packet Loss Rate 540 | Balance Factor 550 |
|---|---|---|---|---|
| 1 | 1 | 12.5 | 0.02 | 0.5 |
| 1 | 2 | 25 | 0.25 | 1.0 |
| 2 | 1 | 20 | 0.05 | 0.75 |
| 2 | 2 | 40 | 0.10 | 0.5 |

500

TRAFFIC MEASUREMENT SYSTEM FOR WIRELESS SERVICE PROVIDERS

BACKGROUND

Network measurements, such as jitter, packet loss rate, latency, or the like, may be determined across a network. A network specification may include traffic requirement specifications to be met across an individual network element. Network element configuration parameters may be adjusted to meet traffic requirement specifications.

DETAILED DESCRIPTION

The following detailed description of example implementations refers to the accompanying drawings. The same reference numbers in different drawings may identify the same or similar elements.

Network element configuration parameters may be configured for particular traffic patterns. The configuration parameters may be adjusted based on the network traffic pattern in order to increase overall network performance and/or to achieve quality of service ("QoS") scheduling parameters. Network taps may be used to capture traffic data associated with the traffic pattern of a network. However, the quantity of traffic data that can be generated from end-to-end per traffic flow, per segment network monitoring may be greater than can be reasonably collected and processed. Implementations described herein may aggregate packet flow information to determine network performance parameters, and may compress the information associated with the network performance parameters for delivery to a central server in order to facilitate network element configuration parameter adjustment.

A "packet," as used herein, may refer to a packet, a datagram, a cell, a frame, a fragment of a packet, a fragment of a datagram, a fragment of a cell, a fragment of a frame, or any other type or arrangement of data that may be carried at a specified communication layer.

Figure 1:
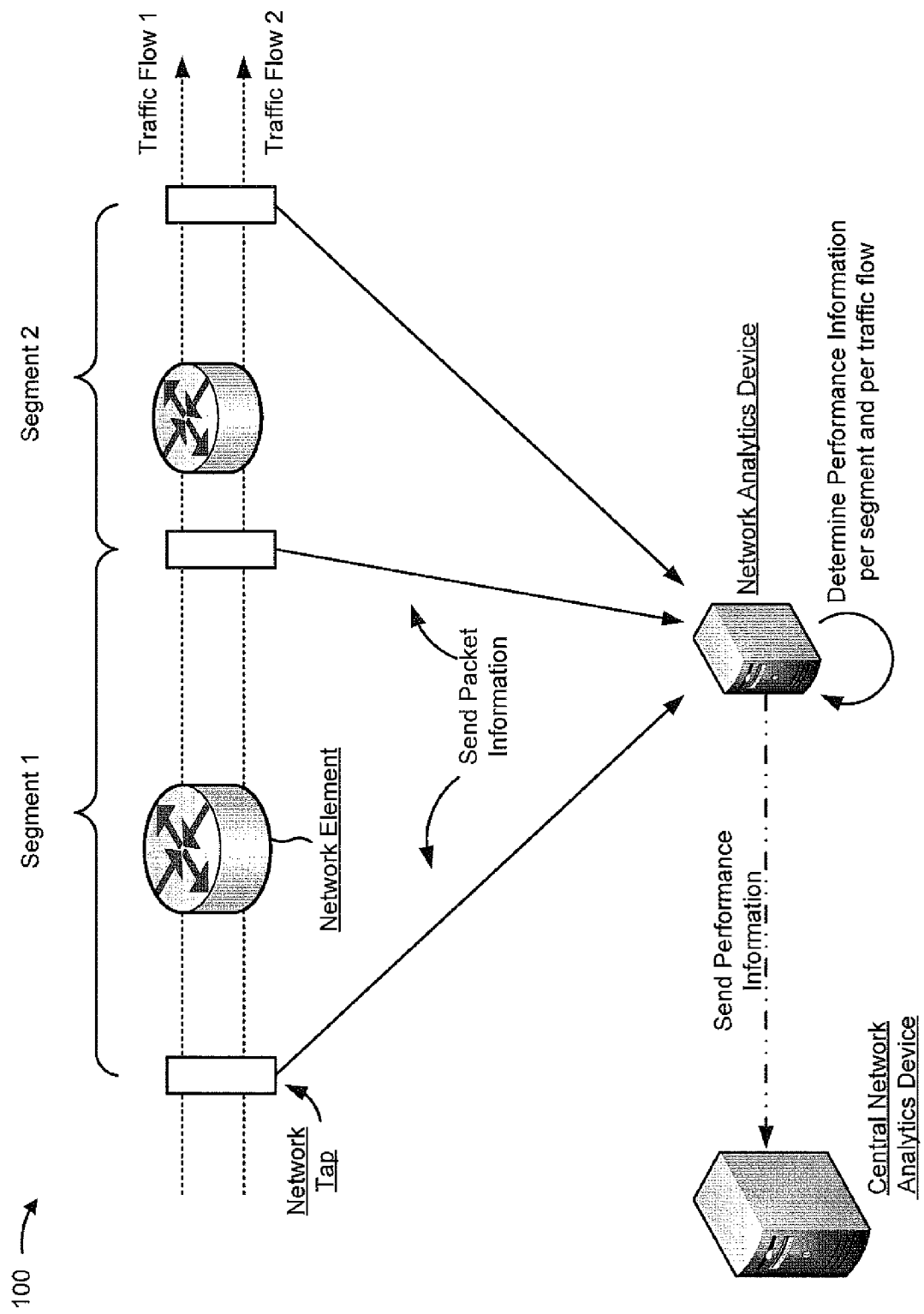
FIG. 1 is a diagram of an overview of an example implementation described herein.

FIG. 1 is a diagram of an overview of an example implementation 100 described herein. As shown in FIG. 1, example implementation 100 may include multiple network taps, a network element, a network analytics device, and a central network analytics device. For example, the multiple network taps may include packet sniffers; the network element may include one or more network devices, such as a serving gateway, a packet gateway, a router, a switch, a base station, or the like; the network analytics device may include a server; and the central network analytics device may include a server. A network may include one or more segments, which may include a portion of the network that is located between two network taps.

As shown in FIG. 1, the network analytics device may receive packet information, associated with a packet, from a network tap. The network analytics device may then determine network performance parameters associated with the packet information. Network performance parameters may include per traffic flow, per segment metrics, such as a latency of a particular traffic flow over a particular segment, a quantity of packet drops of a particular traffic flow over a particular segment, a balance factor (e.g., a figure of merit capturing the extent to which multiple queues associated with network element 220 are aligned to the traffic pattern), or the like. The network analytics device may determine network performance parameters by aggregating received packet information by time, by traffic flow, and by segment, and determining performance parameters for each segment and/or traffic flow. The network analytics device may determine performance information (e.g., by compressing information identifying the network performance parameters) and may transmit the performance information to the central network analytics device. In this way network performance parameters may be determined for each segment and/or traffic flow of a network, and may be used to enhance network performance.

Figure 2:
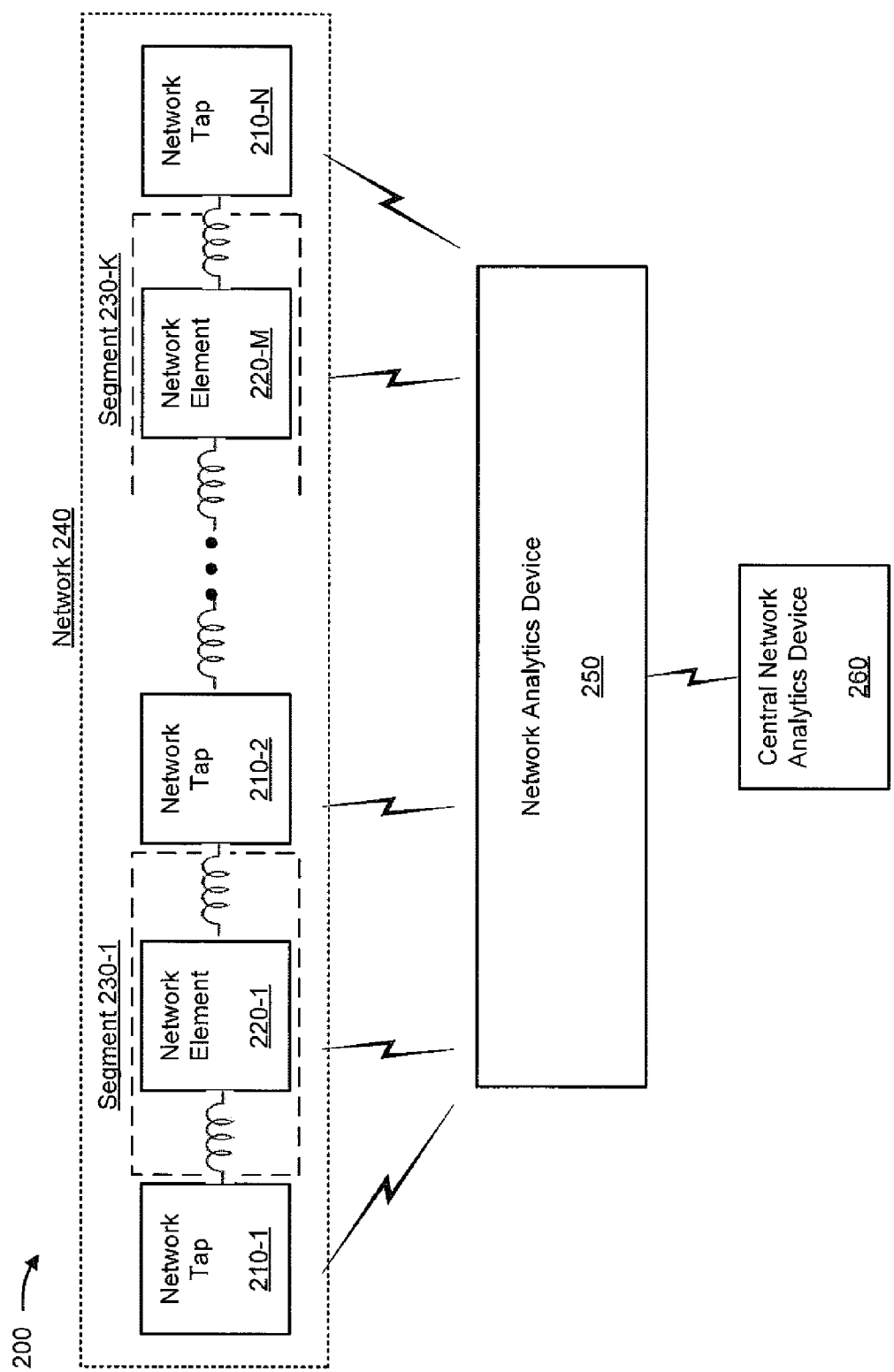
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include multiple network taps 210-1 through 210-N (N>2) (hereinafter referred to collectively as "network taps 210," and individually as "network tap 210"), one or more network elements 220-1 through 220-M (M>1) (hereinafter referred to collectively as "network elements 220," and individually as "network element 220"), one or more network segments 230-1 through 230-K (K>1) (hereinafter referred to collectively as "segments 230," and individually as "segment 230"), a network 240, a network analytics device 250, and a central network analytics device 260. Devices of environment 200 may interconnect via wired connections, wireless connections, or a combination of wired and wireless connections.

Network tap 210 may include one or more devices capable of receiving, generating, capturing, processing, storing, and/or transmitting information associated with data flowing across a network, such as packet information. For example, network tap 210 may include a packet analyzer, a packet sniffer, a network analyzer, a virtual network tap, and/or another similar type of device. Network tap 210 may capture traffic sent along segment 230. Capturing a packet, as used herein, may include capturing a packet, capturing a copy of a packet, capturing information associated with a packet, or the like. For example, network tap 210 may detect a packet traveling along a flow of network 240, and may create a copy of the packet to determine packet information associated with the packet.

Network tap 210 may be classified as an opening network tap and/or a closing network tap, in some implementations. For example, the initial tap through which a packet passes while being transmitted via a segment 230 of network 240 may be referred to as opening tap 210. The final tap through which the packet passes while being transmitted through segment 230 may be referred to as closing tap 210. The closing tap 210 of a first segment 230 may be the opening tap 210 of a second segment 230, in some implementations.

Network element 220 may include one or more devices capable of receiving, generating, processing, storing, and/or transmitting network traffic, such as packet information, along a network. For example, network element 220 may include a base station (e.g., an eNodeB ("eNB")), a server (e.g., a mobility management entity ("MME") server, a home subscriber server ("HSS"), etc.), a gateway (e.g., a serving gateway ("SGW"), a public data network ("PDN") gateway ("PGW"), etc.), a router, a switch, a bridge, a hub, a network interface card ("NIC"), an optical add-drop multiplexer ("OADM"), an Ethernet device, an Ethernet back haul ("EBH") device, a wired connection, a wireless connection, a multiservice provisioning platform ("MSPP"), and/or another similar type of device. In some implementations, network element 220 may refer to one or more devices that may be monitored as a single network element on a single segment 230. For example, an Ethernet device and an EBH device may be considered a single network element when the Ethernet device and the EBH device are monitored as part of a single segment 230.

Segment 230 may include one or more subdivisions of network 240 capable of being monitored by a pair of network taps 210. For example, segment 230 may be a control area, bound by an opening network tap and a closing network tap. In some implementations, a first segment 230 and a second segment 230 may be bound by the same network tap 210. In some implementations, segment 230 may include one or more traffic flows of network 240. A traffic flow may include a coordinated sequence of packets (e.g., described by a differentiated services code point ("DSCP")), such as a bearer channel, a host-to-host communication path, a socket-to-socket communication, a bit stream, or the like, sent along network 240.

Network 240 may include one or more wired and/or wireless networks. For example, network 240 may include a cellular network (e.g., a long term evolution ("LTE") network, a code division multiple access ("CDMA") network, etc.), a public land mobile network ("PLMN"), a Wi-Fi network, a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks. In some implementations, network 240 may be subdivided into multiple segments 230.

Network analytics device 250 may include one or more devices capable of receiving, generating, processing, storing, and/or providing traffic information associated with network 240. For example, network analytics device 250 may include a server capable of monitoring segment 230 via one or more network taps 210. In some implementations, network analytics device 250 may determine a network performance parameter based on packet information received from network tap 210, and may adjust a network element configuration parameter based on the network performance parameter. In some implementations, network analytics device 250 may be capable of providing network performance parameters for display. Additionally, or alternatively, network analytics device 250 may transmit performance information and/or a compressed network performance parameter to central network analytics device 260 for processing and/or display.

Central network analytics device 260 may include one or more devices capable of receiving, generating, processing, storing, and/or providing network traffic information associated with network 240. For example, central network analytics device 260 may include a server capable of receiving performance information and/or a compressed network performance parameter from network analytics device 250. In some implementations, central network analytics device 260 may provide the received information for display. In some implementations, central network analytics device 250 may cause a network element configuration parameter to be adjusted based on the received information.

The number of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
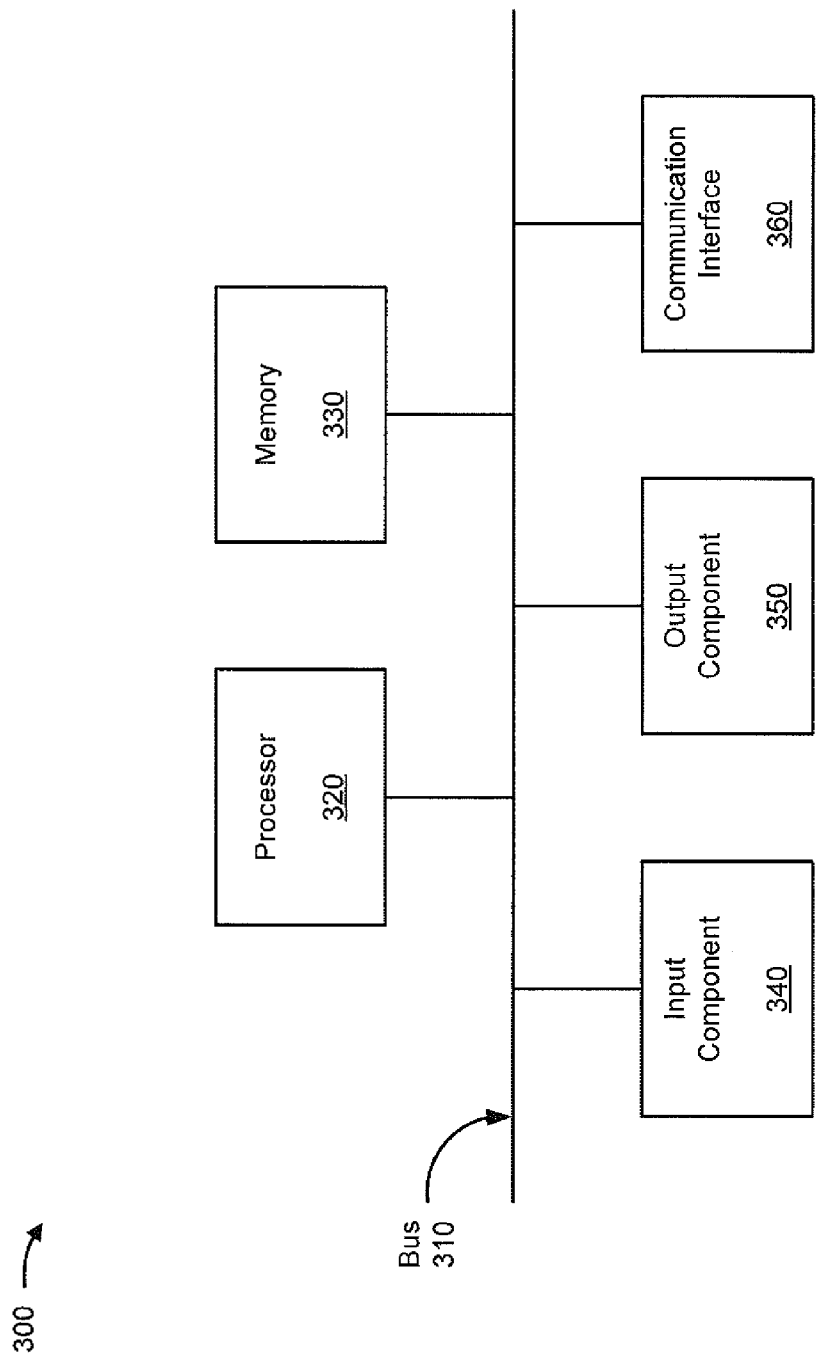
FIG. 3 is a diagram of example components of one or more devices of FIG. 2.

FIG. 3 is a diagram of example components of a device 300. Device 300 may correspond to network tap 210, network element 220, network analytics device 250, and/or central network analytics device 260. Additionally, or alternatively, each of network tap 210, network element 220, network analytics device 250, and/or central network analytics device 260 may include one or more devices 300 and/or one or more components of device 300. As shown in FIG. 3, device 300 may include a bus 310, a processor 320, a memory 330, an input component 340, an output component 350, and a communication interface 360.

Bus 310 may include a path that permits communication among the components of device 300. Processor 320 may include a processor (e.g., a central processing unit, a graphics processing unit, an accelerated processing unit), a microprocessor, and/or any processing component (e.g., a field-programmable gate array ("FPGA"), an application-specific integrated circuit ("ASIC"), etc.) that interprets and/or executes instructions. Memory 330 may include a random access memory ("RAM"), a read only memory ("ROM"), and/or another type of dynamic or static storage device (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Output component 350 may include a component that outputs information from device 300 (e.g., a display, a speaker, one or more light-emitting diodes ("LEDs"), etc.).

Communication interface 360 may include a transceiver-like component, such as a transceiver and/or a separate receiver and transmitter, that enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency ("RF") interface, a universal serial bus ("USB") interface, a Wi-Fi interface, a cellular network interface, or the like.

Device 300 may perform various operations described herein. Device 300 may perform these operations in response to processor 320 executing software instructions included in a computer-readable medium, such as memory 330. A computer-readable medium may be defined as a non-transitory memory device. A memory device may include memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3.

Figure 4:
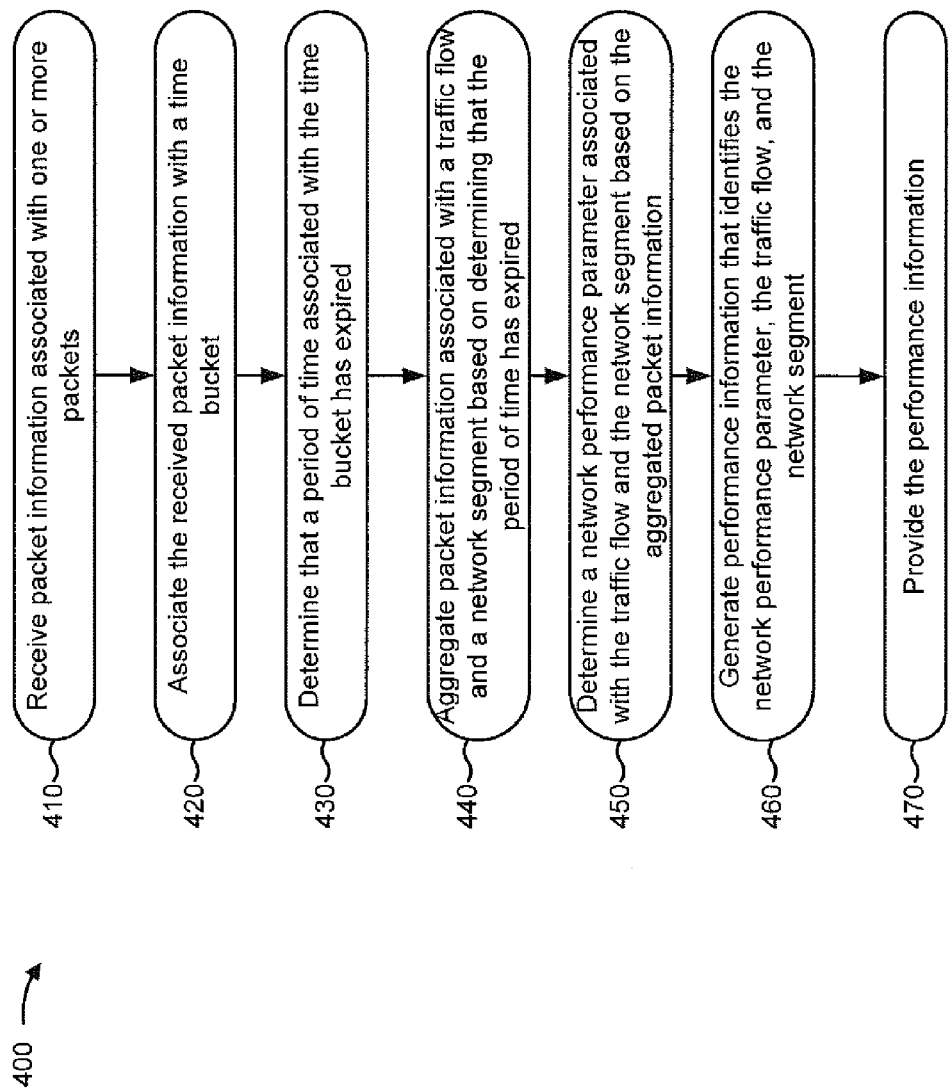
FIG. 4 is a flow chart of an example process for measuring traffic on an end-to-end per traffic flow, per segment basis.

FIG. 4 is a flow chart of an example process 400 for measuring traffic on an end-to-end per traffic flow, per segment basis. In some implementations, one or more process blocks of FIG. 4 may be performed by network analytics device 250. Additionally, or alternatively, one or more process blocks of FIG. 4 may be performed by another device or a group of devices separate from or including network analytics device 250, such as network tap 210, network element 220, and/or central network analytics device 260.

As shown in FIG. 4, process 400 may include receiving packet information associated with a traffic flow (block 410). For example, network analytics device 250 may receive packet information, associated with a traffic flow of network 240, from network tap 210. A packet may include a packet header and payload data. Packet information may include information contained in one or more packets, such as a timestamp, a source address (e.g., an internet protocol ("IP") source address), a destination address (e.g., an IP destination address), a port identifier (e.g., an IP port identifier), a packet identifier, a flow identifier, a DSCP identifier, a service identifier, or the like. A packet may be transmitted through network tap 210, in some implementations. For example, multiple network taps 210 may be set up in such a way as to divide network 240 into multiple segments 230. In this case, opening network tap 210 may capture a packet at the beginning point of segment 230 and closing network tap 210 may capture the packet at the end point of segment 230.

Packets captured by network tap 210 may be processed to determine the packet information, in some implementations. For example, network analytics device 250 may process a packet captured by network tap 210 to remove the payload data and capture the packet header. In some implementations, packets captured by network tap 210 may be associated with a timestamp representing the time at which the packet traveled through network tap 210.

A traffic flow may include a subdivision of traffic traveling over network 240, in some implementations. For example, network 240 may carry packets associated with a DSCP value. A DSCP value, as used herein, may identify a particular service (e.g., a voice service, a data service, etc.) associated with the packet. In some implementations, the DSCP value may be associated with a quality of service ("QoS") parameter. For example, network element 220 may use the QoS parameter to determine how to prioritize a packet, associated with the traffic flow, that is received by network element 220.

As shown in FIG. 4, process 400 may include associating the received packet information with a time bucket (block 420). For example, network analytics device 250 may associate the received packet information with a time bucket representing a time at which the packet and/or the packet information was captured. A time bucket, as used herein, may refer to a period of time during which packet information may be collected, stored, and/or grouped. In some implementations, network analytics device 250 may determine the association based on the timestamp of the received packet information. For example, the time bucket may include a range of timestamps, and network analytics device 250 may store received packet information in the time bucket when the timestamp associated with the packet information occurs within the time bucket range. Packet information, associated with packets, may arrive unsynchronized based on a network condition, such as network latency, packet delay, packet loss, etc. The time bucket may be used to group packet information collected over a period of time, and may allow packets that have experienced a higher latency to be collected.

As shown in FIG. 4, process 400 may include determining that a period of time associated with the time bucket has expired (block 430). For example, network analytics device 250 may determine a period of time associated with collecting packet information in a particular time bucket, and may determine that the period of time has expired. The length of the period of time may be determined based on a network condition, such as network latency, packet delay, packet loss rate, or the like, in some implementations.

As shown in FIG. 4, process 400 may include aggregating the packet information associated with a traffic flow and a network segment based on determining that the period of time has expired (block 440). For example, network analytics device 250 may determine a correlation between first received packet information, associated with a packet captured at opening network tap 210, and second received packet information, associated with the packet captured at closing network tap 210.

Network analytics device 250 may determine a correlation between multiple packets based on packet information, in some implementations. For example, network analytics device 250 may determine that multiple packets are associated with the same traffic flow based on a DSCP value, a source address, a destination address, or the like.

Network analytics device 250 may identify received packet information that is associated with a packet across multiple segments, in some implementations. For example, network analytics device 250 may determine received packet information associated with the same packet captured at multiple network taps. In some implementations, network analytics device 250 may determine the segment at which a packet was dropped based on identifying received packet information associated with a packet across multiple segments. For example, network analytics device 250 may identify received packet information associated with a packet captured at an opening network tap 210 of segment 230, and may determine that no packet information associated with the packet has been received at a closing network tap 210 of segment 230. In this case, segment 230 may be identified as the segment at which the packet was dropped.

As shown in FIG. 4, process 400 may include determining a network performance parameter associated with the traffic flow and the network segment based on the aggregated packet information (block 450). For example, network analytics device 250 may determine the network performance parameter for a packet traveling via the traffic flow over segment 230 based on the aggregated packet information associated with the packet. In this case, network analytics device 250 may determine a network performance parameter associated with an individual packet (e.g., a per packet, per segment network performance parameter), such as a latency across a segment 230, a determination associated with whether a packet was dropped at the segment 230, or the like. In some implementations, network analytics device 250 may determine the network performance parameter for a packet traveling via the traffic flow over segment 230 based on comparing packet information associated with a packet at opening network tap 210 and closing network tap 210 (e.g., comparing the timestamp associated with the packet information at the opening network tap 210 and at the closing network tap 210).

Additionally, or alternatively, network analytics device 250 may aggregate network performance parameters associated with individual packets (e.g., per packet, per segment network performance parameters) to determine a network performance parameter associated with the traffic flow over the particular segment 230 (e.g., a per traffic flow, per segment network performance parameter). For example, the network performance parameter for the traffic flow over the particular segment 230 may include a mean throughput value, a mean latency value, an error rate, a jitter value, a balance factor, a dropped packet rate, an out-of-order delivery rate, or the like.

Additionally, or alternatively, network analytics device 250 may aggregate network performance parameters associated with multiple traffic flows over the particular segment 230 to determine a network performance parameter associated with the particular segment 230 (e.g., a per segment network performance parameter). Additionally, or alternatively, network analytics device 250 may aggregate network performance parameters associated with the traffic flow over multiple segments 230 to determine a network performance parameter associated with the traffic flow (e.g., a per traffic flow network performance parameter). Additionally, or alternatively, network analytics device 250 may aggregate network performance parameters associated with the multiple traffic flows over multiple segments 230 to determine a network performance parameter associated with network 240 or a portion of network 240.

Network analytics device 250 may cause a configuration associated with network element 220 to be changed based on determining the network performance parameter associated with network element 220 (e.g., a network performance parameter associated with a segment 230 that encompasses network element 220), in some implementations. For example, network analytics device 250 may determine that the quantity of dropped packets associated with segment 230 satisfies a threshold. In this case, network analytics device 250 may adjust a configuration parameter associated with network element 220, a network element encompassed by segment 230, in order to reduce the quantity of dropped packets. A configuration parameter, as described herein, may refer to one or more settings associated with network element 220, such as a queue length, a queue weight, a buffer length, a packet scheduling algorithm, or the like.

As shown in FIG. 4, process 400 may include generating performance information that identifies the network performance parameter, the traffic flow, and the network segment (block 460). For example, network analytics device 250 may generate performance information that identifies the per traffic flow, per segment network performance parameter. In some implementations, network analytics device 250 may compress the performance information using a form of data compression to encode the one or more network performance parameters. Data compression may involve encoding information into fewer bits than the original representation using an algorithm, such as using run-length encoding, subnet prefix trimming (e.g., removing repetitive IP address subnet prefixes), or the like.

The information that identifies the network performance parameter may include packet information, in some implementations. For example, the performance information may include the packet information used to determine the network performance parameter. In this case, network analytics device 250 may use a data compression technique on the packet information.

The performance information that identifies the network performance parameter may include additional identification information, in some implementations. For example, network analytics device 250 may prepend a common language location identifier ("CLLI") code, associated with a mobile switching center ("MSC"), and/or a segment identification ("ID"), associated with segment 230, to the performance information that identifies the network performance parameter. Based on the CLLI code and/or the segment ID, a device (e.g., central network analytics device 260) may determine the network element 220 measured by the network performance parameter.

As further shown in FIG. 4, process 400 may include providing the performance information (block 470). For example, network analytics device 250 may provide the performance information to central network analytics device 260. In some implementations, central network analytics device 260 may apply decompression techniques when the performance information is compressed. For example, when run-length encoding is used to compress the performance information, central network analytics device 260 may use reverse run-length encoding to decompress the performance information.

Network analytics device 250 may provide the performance information for display, in some implementations. For example, network analytics device 250 may provide the network performance parameter, identified by the performance information, to a user via a display device. In this case, the user may provide input that causes a network element configuration parameter associated with network element 220 to be adjusted based on the network performance parameter. In some implementations, providing the performance information may include generating reports based on a network performance parameter, storing the network performance parameter, determining other network performance information based on processing the network performance parameter, or the like Central network analytics device 260 may determine a global performance parameter based on multiple network performance parameters received from one or more network analytics devices 250, in some implementations. For example, central network analytics device 260 may determine a global performance parameter associated with one or more networks 240 based on receiving the multiple network performance parameters from the multiple network analytics devices 250.

Central network analytics device 260 may adjust a network element configuration parameter associated with network element 220 based on receiving the performance information from network analytics device 250, in some implementations. For example, central network analytics device 260 may determine, based on the network performance parameter, that the network element configuration parameter associated with network element 220 may be adjusted to account for a network traffic pattern. In this case, central network analytics device 260 may adjust the network element configuration parameter in order to modify the performance of network 240 and/or the performance of a network device associated with network element 220.

Central network analytics device 260 may process the network performance parameter, in some implementations. For example, central network analytics device 260 may generate reports based on the network performance parameter, may determine network performance information based on the network performance parameter, may store the network performance parameter, or the like.

In this way, network analytics device 250 may measure network traffic on an end-to-end per traffic flow, per segment basis and output information associated with the network traffic to central network analytics device 260.

Although FIG. 4 shows example blocks of process 400, in some implementations, process 400 may include additional blocks, different blocks, fewer blocks, or differently arranged blocks than those depicted in FIG. 4. Further, one or more of the blocks of process 400 may be omitted in some implementations. Additionally, or alternatively, one or more of the blocks of process 400 may be performed in parallel.

Figure 5:
FIG. 5 is a diagram of an example data structure that stores network performance parameters.

FIG. 5 is a diagram of an example data structure 500 that stores information associated with a network performance parameter (e.g., performance information). Data structure 500 may be stored in a memory device (e.g., a RAM, a hard disk, etc.), associated with one or more devices and/or components shown in FIG. 2 and/or FIG. 3. For example, data structure 500 may be stored by network analytics device 250 and/or central network analytics device 260.

Data structure 500 may include a collection of fields, such as a segment field 510, a traffic flow field 520, a latency field 530, a packet loss rate field 540, and a balance factor field 550.

Segment field 510 may store a segment identifier ("ID") for a segment 230 of network 240. The segment ID may include one or more characters that uniquely identify one or more network elements 220 associated with a network performance parameter. For example, the segment ID's may include a number (e.g., 1, 2, etc.), a CLLI code, a network element identifier, a network device identifier, or the like.

Traffic flow field 520 may store a traffic flow identifier ("ID") for a traffic flow of network 240. The flow ID may include one or more characters that identify a traffic flow. In some implementations, the flow ID may correlate to a DSCP value associated with packets being transmitted via network 230 (e.g., a service whose network performance across network element 220 is measured by a network performance parameter).

Latency field 530 may store information that identifies a latency value associated with segment 230, identified by segment field 510, and/or a traffic flow, identified by traffic flow field 520. In some implementations, the latency value may be expressed as a quantity of a unit of time (e.g., milliseconds ("ms")). In some implementations, the latency value may be determined by network analytics device 250 based on comparing network packet information collected at an opening network tap 210 and a closing network tap 210 associated with segment 230.

Packet loss rate field 540 may store information that identifies a packet loss rate associated with segment 230 identified by segment field 510, and/or a traffic flow identified by traffic flow field 520. In some implementations, the packet loss rate (e.g., a total percentage of packets lost, an average percentage of packets lost over a time period, etc.), may be determined by network analytics device 250 based on the quantity of packets captured at closing network tap 210 divided by the quantity of packets captured at opening network tap 210.

Balance factor field 550 may store information that identifies a balance factor associated with the traffic flow over network element 220. In some implementations, the balance factor may be determined by the relative weight (e.g., relative number of packets queued) of the QoS queues associated with network element 220, measured as a ratio determined from comparing the size of the queues.

Information associated with a per traffic flow, per segment network performance parameter associated with network 240 may be conceptually represented as a row in data structure 500. For example, the first row in data structure 500 may correspond to measurements taken of packets with a flow ID of 1 (e.g., a DSCP value of 1) as measured across a first segment, identified as segment 1, of network 240. Network analytics device 250 may determine a network performance parameter, associated with traffic flow 1 over segment 1 based on the packet information captured using network taps 210. For example, by comparing the packet information captured at an opening network tap 210 and a closing network tap 210, network analytics device 250 may determine the latency of traffic flow 1 across segment 1 to be 12.5 milliseconds. Additionally, or alternatively, by comparing the quantity of packets captured at opening network tap 210 and the quantity of packets captured at closing network tap 210, network analytics device 250 may determine the percentage of packets, associated with traffic flow 1, dropped during transmission across segment 230. In this case, network analytics device 240 determines the packet loss rate to be 0.02. Additionally, or alternatively, network analytics device 250 may determine, based on the weight of queues associated with a network element 220 (e.g., a network element encompassed by segment 1), a balance factor of 0.5.

Data structure 500 includes fields 510-550 for explanatory purposes. In practice, data structure 500 may include additional fields, fewer fields, different fields, or differently arranged fields than those illustrated in FIG. 5 and/or described herein with respect to data structure 500.

Figure 6A:
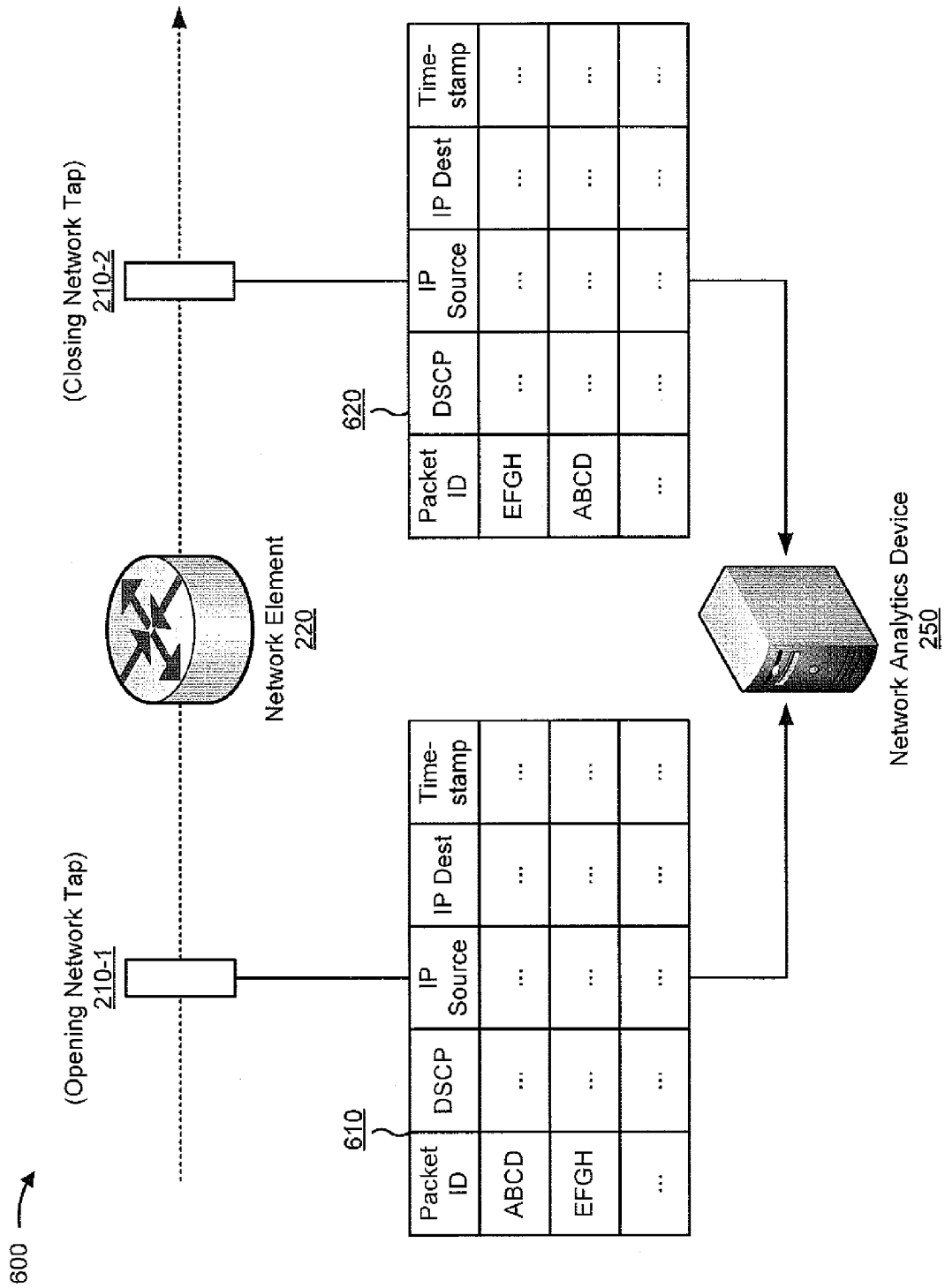
FIGS. 6A, 6B, 6C, and 6D are diagrams of an example implementation relating to the example process shown in FIG. 4.

FIGS. 6A, 6B, 6C, and 6D are diagrams of an example implementation 600 relating to process 400 shown in FIG. 4. As shown in FIG. 6A, example implementation 600 may include an opening network tap 210-1, a network element 220, a closing network tap 210-2, and a network analytics device 250. As shown by reference number 610, network analytics device 250 receives, from opening network tap 210-1, packet information associated with packets captured by opening network tap 210-1. As shown by reference number 620, network analytics device 250 receives, from closing network tap 210-2, packet information associated with packets captured by closing network tap 210-2. The received packet information may include a packet ID, a DSCP value, an internet protocol ("IP") source address, an IP destination ("Dest") address, a timestamp, or the like.

Figure 6B:
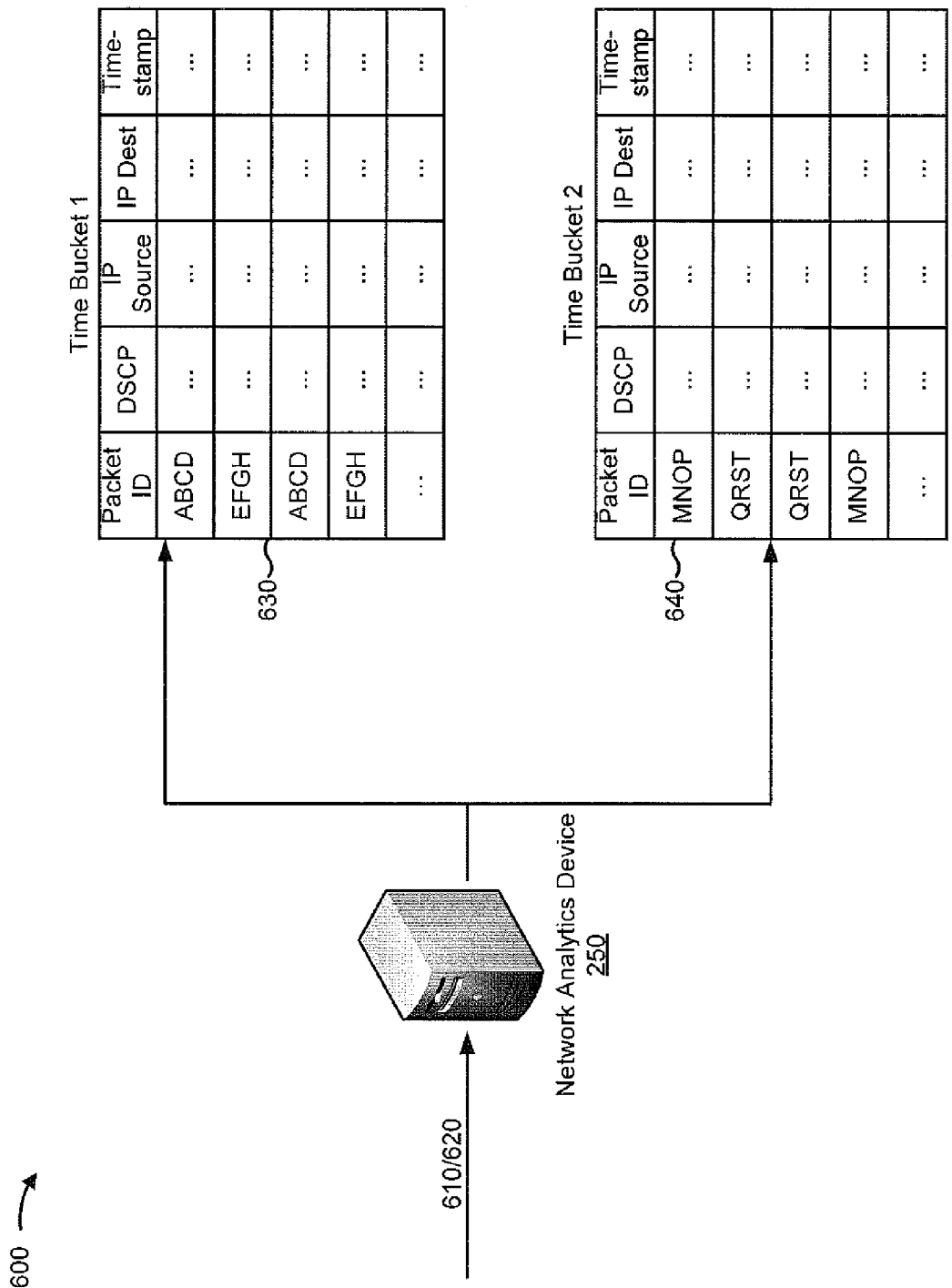

As shown in FIG. 6B, network analytics device 250 receives the packet information shown by reference number 610 and reference number 620. As shown by reference number 630, network analytics device 250 may associate the received packet information with a first time bucket ("Time Bucket 1"). As shown by reference number 640, network analytics device 250 may associate the received packet information with a second time bucket ("Time Bucket 2"). Network analytics device 250 associates the received packet information with the time buckets based on the timestamp included within the received packet information. For example, assume that packet information received during a first time period is associated with Time Bucket 1 and packet information received during a second time period is associated with Time Bucket 2.

Figure 6C:
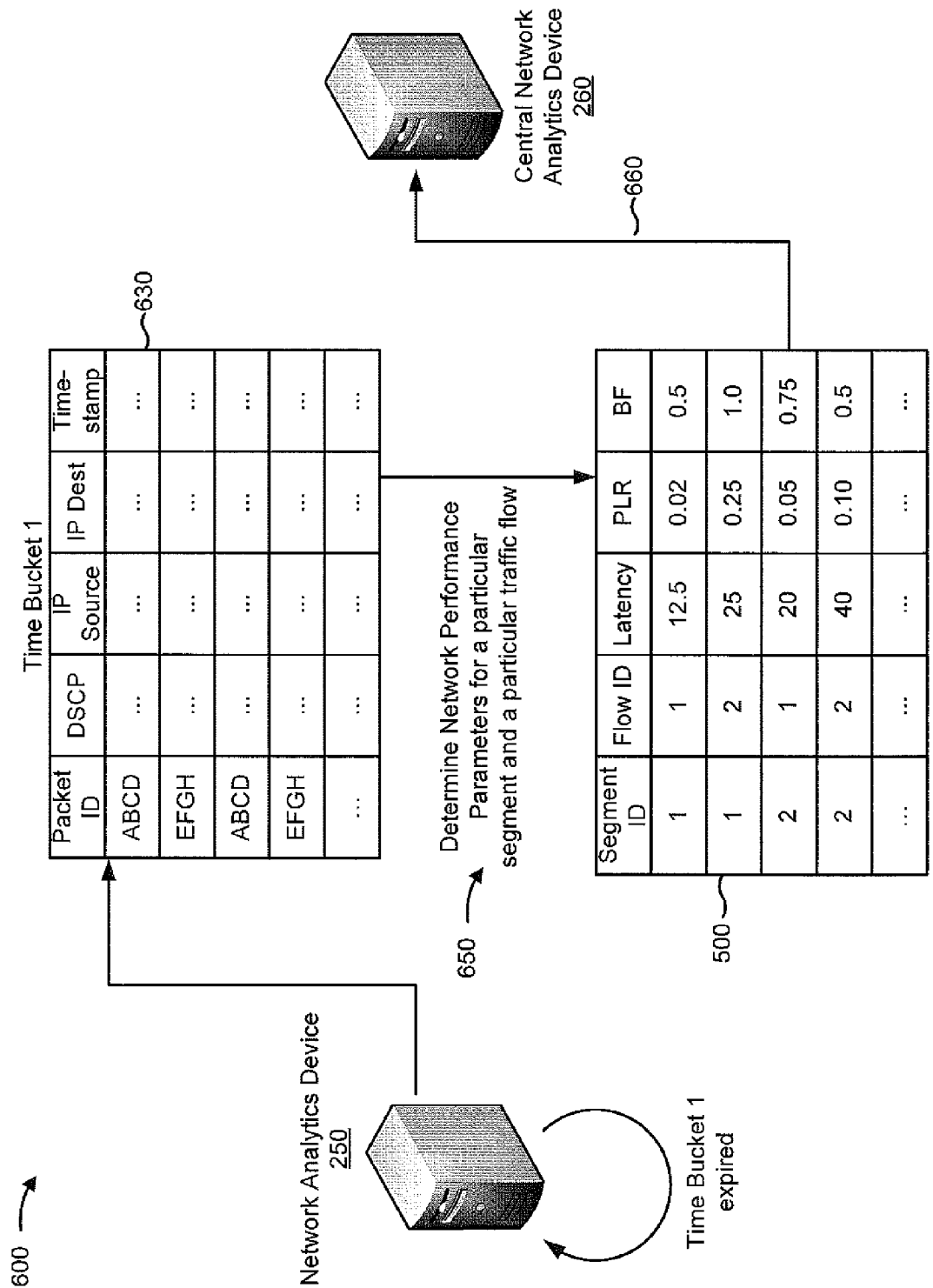

As shown in FIG. 6C, network analytics device 250 determines that Time Bucket 1 has expired. As shown by reference number 650, received packet information associated with Time Bucket 1 is used to determine network performance parameters for a particular segment and a particular traffic flow, such as a latency, a packet loss rate ("PLR"), and a balance factor ("BF"). For example, network analytics device 250 aggregates the received packet information associated with a particular traffic flow over a particular segment, and determines network performance parameters based on the aggregated packet information.

As further shown by reference number 650, network analytics device 250 may store network performance parameters in data structure 500, as described herein in conjunction with FIG. 5. As shown by reference number 660, network analytics device 250 generates and provides performance information, associated with the network performance parameters stored in data structure 500, to central network analytics device 260.

Figure 6D:
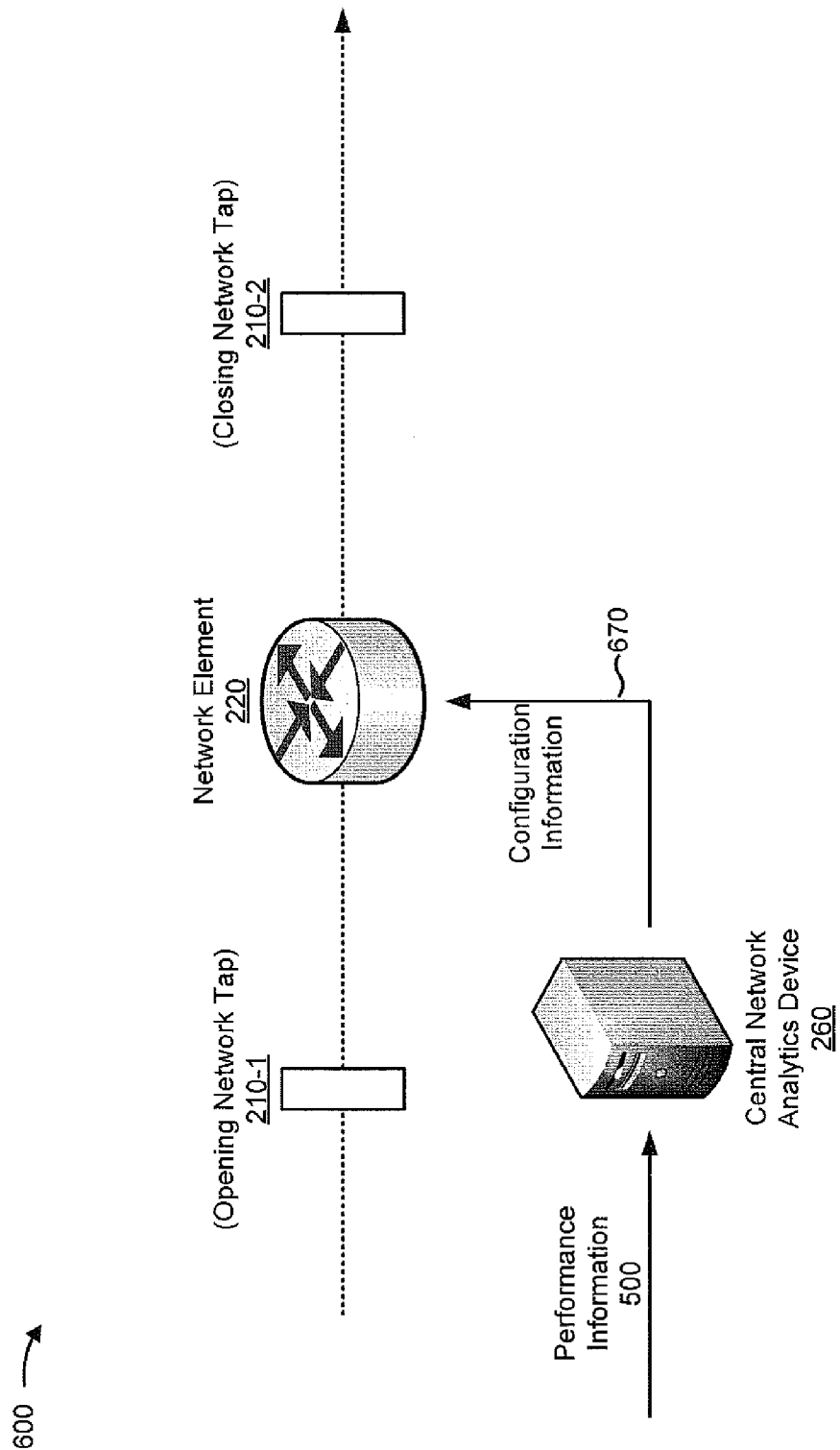

As shown in FIG. 6D, central network analytics device 260 receives the performance information and may, based on the performance information, determine configuration information associated with network element 220. As shown by reference number 670, central network analytics device 260 transmits the configuration information to network element 220.

As indicated above, FIGS. 6A, 6B, 6C, and 6D are provided merely as an example. Other examples are possible and may differ from what was described with regard to FIGS. 6A, 6B, 6C, and 6D.

Figure 7A:
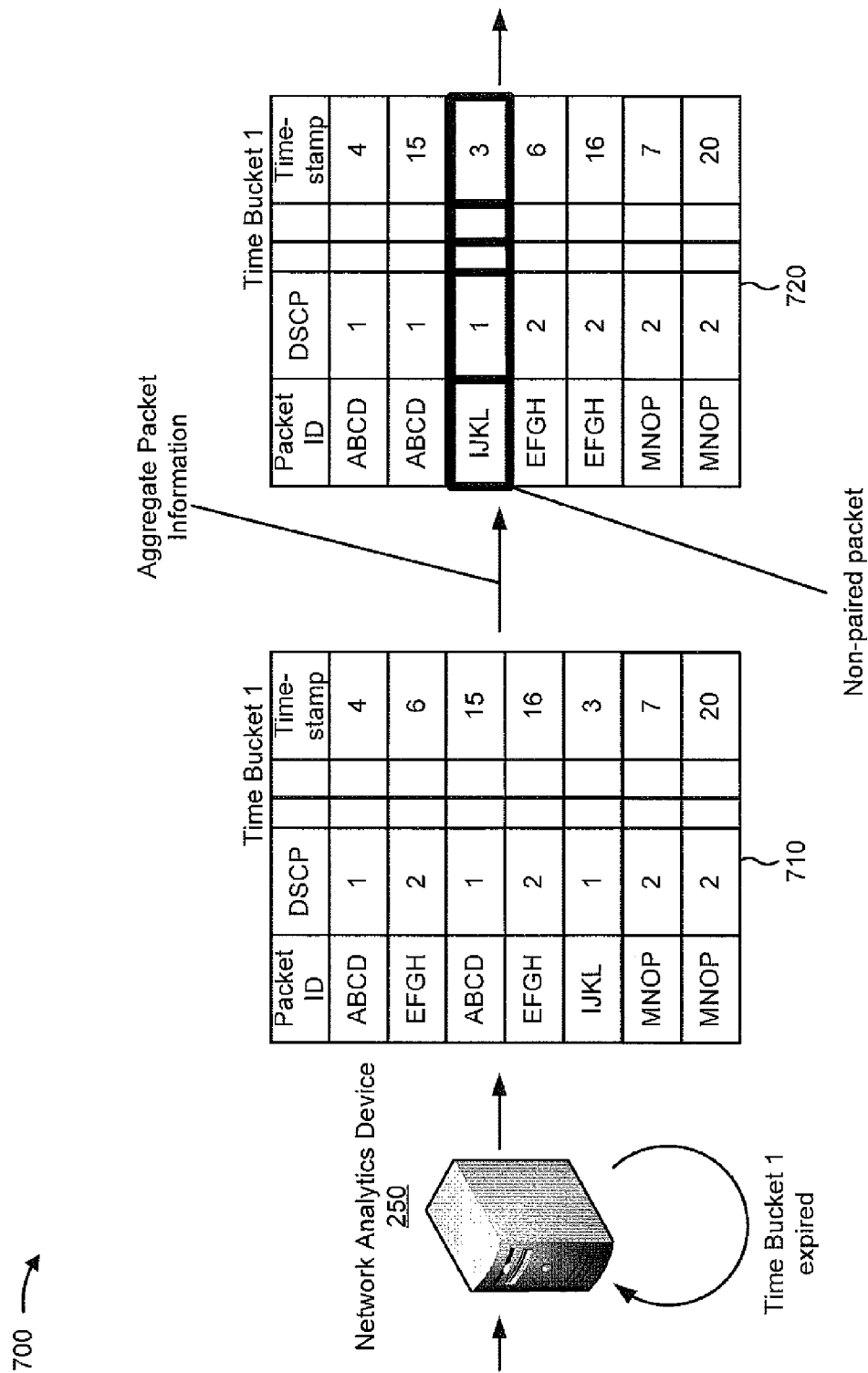
FIGS. 7A and 7B are diagrams of another example implementation relating to the example process shown in FIG. 4.
Figure 7B:
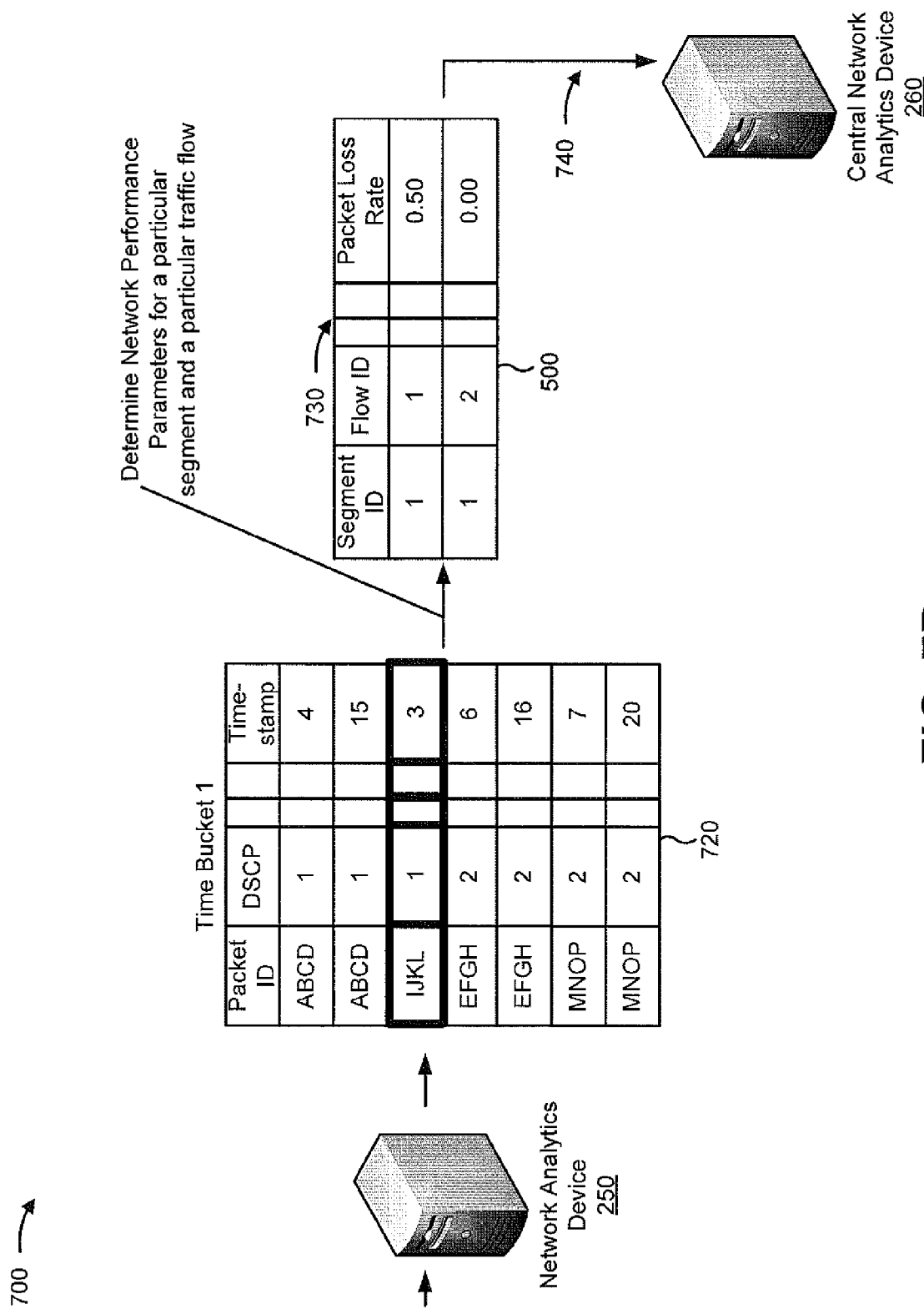

FIGS. 7A and 7B are diagrams of an example implementation 700 relating to process 400 shown in FIG. 4. As shown in FIG. 7A, example implementation 700 may include a network analytics device 250. Network analytics device 250 may determine that a period of time, associated with a time bucket ("Time Bucket 1") has expired. As shown by reference number 710, Time Bucket 1 may include received packet information associated with captured packets, such as a packet ID, a DSCP value, a timestamp, or the like. Network analytics device 250 aggregates the packet information based on a particular traffic flow across a particular segment. As shown by reference number 720, aggregating the packet information may include determining packet information, associated with a packet, captured from an opening network tap 210, that does not have corresponding packet information, associated with the packet, captured from a closing network tap 210. For example, assume that network analytics device 250 determines that the packet information associated with a packet ID of "IJKL" has been captured from opening tap 210, and that there is no packet information associated with a packet ID of "IJKL" that has been captured from closing tap 210. In this case, network analytics device 250 may determine that segment 230, a segment bound by opening tap 210 and closing tap 210, is the segment at which packet "IJKL" was dropped.

As shown in FIG. 7B, network analytics device determines network performance parameters for a particular segment and a particular traffic flow based on the received packet information shown by reference number 720. As shown by reference number 730, network analytics device 250 determines that for the segment with a segment ID of 1 and a flow ID of 1, the packet loss rate is 0.50, based on the packet with a packet ID of "ABCD" being successfully transmitted across segment 1 and packet "IJKL" being unsuccessfully transmitted across segment 1. Network analytics device 250 determines that for the segment with a segment ID of 1 and a flow ID of 2 the packet loss rate is 0.0, based on both packets (e.g., packet ID: "EFGH" and packet ID: "MNOP") being successfully transmitted. As shown by reference number 740, network analytics device 250 transmits performance information identifying the network performance parameters to central network analytics device 260.

As indicated above, FIGS. 7A and 7B are provided merely as an example. Other examples are possible and may differ from what was described with regard to FIGS. 7A and 7B.

Figure 8A:
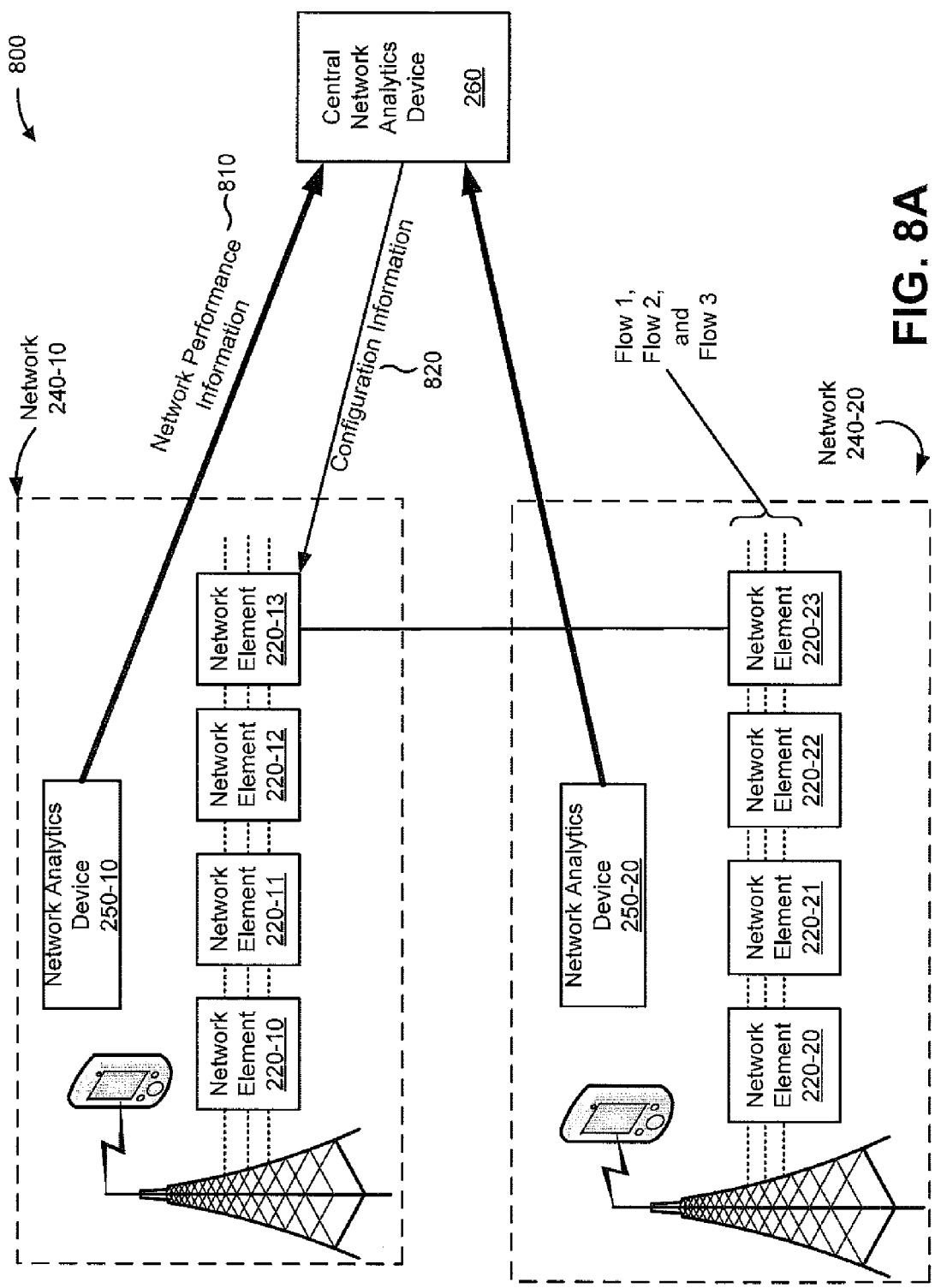
FIGS. 8A and 8B are diagrams of another example implementation relating to the example process shown in FIG. 4.
Figure 8B:
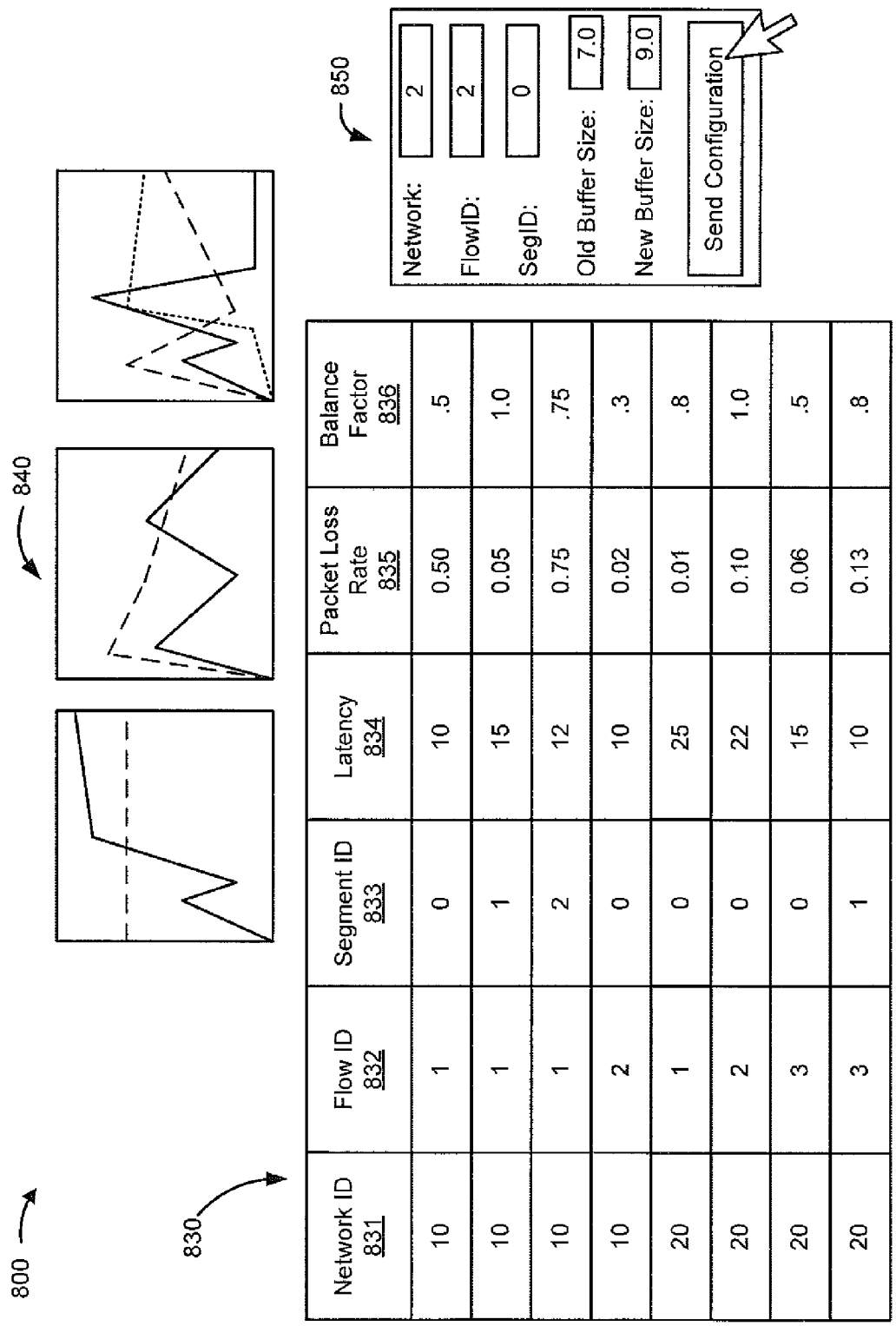

FIGS. 8A and 8B are diagrams of an example implementation 800 relating to process 400 shown in FIG. 4. In example implementation 800, network performance parameters may be gathered from multiple network analytics devices 250 and performance information may be transmitted to a central network analytics device 260.

As shown in FIG. 8A, network 240-10 may include a network analytics device 250-10 and multiple network elements, such as network element 220-10, network element 220-11, network element 220-12, and network element 220-13. Network analytics device 250-10 may receive packet information associated with packets traveling across multiple network elements of network 240-10 from multiple network taps (not shown). Network analytics device 250-10 determines network performance parameters associated with traffic flows over segments 230 of network 240-10.

As further shown in FIG. 8A, network 240-20 may include a network analytics device 250-20 and multiple network elements, such as network element 220-20, network element 220-21, network element 220-22, and network element 220-23. Network analytics device 250-20 may receive packet information associated with packets traveling across multiple network elements of network 240-20 from multiple network taps (not shown). Network analytics device 250-20 may determine network performance parameters associated with traffic flows over segments 230 of network 240-20.

As shown by reference number 810, network analytics device 250-10 generates network performance information identifying network performance parameters and transmits the performance information to central network analytics device 260. As shown by reference number 820, central network analytics device 260 determines configuration information identifying an adjustment to the configuration of network element 220-13, and transmits the configuration information to network element 220-13.

As shown by FIG. 8B, a device, such as central network analytics device 260, may include a user interface for monitoring network performance parameters identified by the performance information, such as the performance information generated by network analytics device 250-10 and/or network analytics device 250-20. The user interface may include a display 830, a visualization 840, and an input console 850. Display 830 may organize multiple network performance parameters received from network 240-10 and network 240-20 according to one or more fields, such as a network identifier ("ID") field 831, a traffic flow identifier field 832, a segment identifier field 833, a latency field 834, a packet loss rate field 835, and a balance factor field 836. Network ID field 831 may include information identifying a network 240 associated with the network performance parameters, (e.g., 240-10, 240-20, etc.). Flow ID field 832 may include information identifying the traffic flow of packets measured by the network performance parameters.

Segment ID field 833 may include information identifying the segment across which the network performance parameters were determined. Latency field 834, packet loss rate field 835, and balance factor field 836 may include network performance parameters associated with a particular traffic flow over a particular segment on a particular network 240.

As shown in FIG. 8B, visualization 840 may include one or more information graphics (e.g., graphs, charts, plots, etc.) of the network performance parameters included in display 830. In some implementations, the visualizations may compare the network performance parameters with a threshold network performance parameter or an idealized network performance parameter, and may display a level of tuning (e.g., a figure of merit for the network performance compared with an idealized performance parameter).

As further shown in FIG. 8B, input console 850 may include one or more fields for adjusting a network element configuration parameter. For example, a user of the user interface may determine, based on display 830 and visualization 840, an adjustment to be made to a network element, and may cause the adjustment to be made.

As indicated above, FIGS. 8A and 8B are provided merely as an example. Other examples are possible and may differ from what was described with regard to FIGS. 8A and 8B.

Implementations described herein may allow a network analytics device to determine a per traffic flow, per segment network performance parameter and compress the network performance parameter for storage, output, and/or use.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in conjunction with thresholds. As used herein, satisfying a threshold may refer, depending on the context and/or the particular implementation details, to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

To the extent the aforementioned implementations collect, store, or employ personal information provided by individuals, it should be understood that such information shall be used in accordance with all applicable laws concerning protection of personal information. Storage and use of personal information may be in an appropriate secure manner reflective of the type of information, for example, through various encryption and anonymization techniques for particularly sensitive information.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device comprising:
one or more processors to:
  receive packet information associated with a traffic flow and a network segment,
    the network segment including a portion of a network via which the traffic flow is transmitted, and
    the packet information including first information and second information,
      the first information being received by a first network tap at a first time and being associated with the traffic flow, and
      the second information being received by a second network tap at a second time and being associated with the same traffic flow,
        the second time occurring after the first time, and
      a network element being located between the first network tap and the second network tap,
        the network element being associated with a plurality of queues, each of the plurality of queues having a respective queue length and a respective queue weight;
  associate the received packet information with a period of time;
  determine that the period of time has expired;
  aggregate the received packet information based on determining that the period of time has expired;
  determine a network performance parameter associated with the traffic flow over the network segment based on the aggregated packet information;
  generate performance information that identifies the network performance parameter, the traffic flow, and the network segment;
  provide the performance information;
  modify, based on the performance information, a configuration parameter of the network element,
    the modified configuration parameter being to address a discrepancy between the first information and the second information, and
    the modified configuration parameter including at least one of:
      an adjusted queue length for at least one of the plurality of queues associated with the network element, or
      an adjusted queue weight for at least one of the plurality of queues associated with the network element; and
  transmit, to the network element, information associated with the modified configuration parameter.

2. The device of claim 1, where the one or more processors, when providing the performance information, are to:
output the performance information to an analytics device for display.

3. The device of claim 1, where the one or more processors, when providing the performance information, are to:
output the performance information to an analytics device for processing.

4. The device of claim 1, where the one or more processors are further to:
determine that the network performance parameter satisfies a threshold,
and
the one or more processors, when modifying the configuration parameter, are to:
modify the configuration parameter based on determining that the network performance parameter satisfies the threshold.

5. The device of claim 1, where the one or more processors, when receiving packet information, are to:
determine a timestamp associated with the packet information, and
where the one or more processors, when associating the received packet information with the period of time, are to:
associate the received packet information with the period of time based on the timestamp.

6. The device of claim 1, where the one or more processors, when providing the performance information, are to:
provide the performance information to an analytics device; and
receive, from the analytics device, a configuration adjustment associated with the network element based on the provided performance information,
the one or more processors, when modifying the configuration parameter, are to:
modify the configuration parameter based on the received configuration adjustment.

7. The device of claim 1, where the one or more processors, when aggregating the received packet information, are to:
aggregate the received packet information based on at least one of:
a traffic identifier identifying the traffic flow associated with the received packet information;
a network segment identifier identifying the network segment associated with the received packet information;
a timestamp associated with the received packet information; or
a packet identifier identifying a packet associated with the packet information.

8. The device of claim 1, where the one or more processors, when determining the network performance parameter, are to:
determine that a packet was dropped at the network segment based on the aggregated packet information, and
where the one or more processors, when generating the performance information, are to:
generate performance information indicating that the packet was dropped at the network segment.

9. A non-transitory computer-readable medium storing instructions, the instructions comprising:
one or more instructions that, when executed by one or more processors, cause the one or more processors to:
receive transmission information associated with a packet associated with a traffic flow,
the transmission information including a packet identifier and a timestamp identifying a time at which the packet was received, and
the transmission information including first information and second information,
the first information being received by a first network tap at a first time and being associated with the traffic flow, and
the second information being received by a second network tap at a second time and being associated with the same traffic flow,
the second time occurring after the first time, and
a network element being located between the first network tap and the second network tap,
the network element being associated with a plurality of queues, each of the plurality of queues having a respective queue length and a respective queue weight;
aggregate the transmission information based on the packet identifier and the time at which the packet was received;
determine a network performance parameter associated with the traffic flow over a segment based on the aggregated transmission information,
the segment including a portion of a network via which the traffic flow is transmitted;
generate performance information identifying the network performance parameter, the segment, and the traffic flow;
provide the performance information;
modify, based on the performance information, a configuration parameter of the network element,
the modified configuration parameter being to address a discrepancy between the first information and the second information, and
the modified configuration parameter including at least one of:
an adjusted queue length for at least one of the plurality of queues associated with the network element, or
an adjusted queue weight for at least one of the plurality of queues associated with the network element; and
transmit, to the network element, information associated with the modified configuration parameter.

10. The computer-readable medium of claim 9, where the one or more instructions to determine the network performance parameter include:
one or more instructions to determine that the packet was dropped at the segment based on the aggregated transmission information; and
where the one or more instructions to generate the performance information include:
one or more instructions to generate performance information indicating that the packet was dropped at the segment.

11. The computer-readable medium of claim 9, where the one or more instructions to provide the performance information include:
one or more instructions to output the performance information to an analytics device for processing.

12. The computer-readable medium of claim 9, where the instructions further include:

one or more instructions to determine that the network performance parameter satisfies a threshold, and the one or more instructions to modify the configuration parameter include:
one or more instructions to modify the configuration parameter based on determining that the network performance parameter satisfies the threshold.

13. The computer-readable medium of claim 9, where the one or more instructions to provide the performance information include:
one or more instructions to provide the performance information to an analytics device; and
one or more instructions to receive, from the analytics device, a configuration adjustment associated with the network element based on the provided performance information,
the one or more instructions to modify the configuration parameter include:
one or more instructions to modify the configuration parameter based on the received configuration adjustment.

14. A method comprising:
receiving, by a device, a packet associated with a traffic flow,
the packet including transmission information;
determining, by the device, packet information based on the transmission information from the packet,
the packet information including first information and second information,
the first information being received by a first network tap at a first time and being associated with the traffic flow, and
the second information being received by a second network tap at a second time and being associated with the same traffic flow,
the second time occurring after the first time, and
a network element being located between the first network tap and the second network tap,
the network element being associated with a plurality of queues, each of the plurality of queues having a respective queue length and a respective queue weight;
associating, by the device, the packet information with a period of time;
determining, by the device, that the period of time has expired;
aggregating, by the device, the packet information based on determining that the period of time has expired;
determining, by the device, a network performance parameter associated with the traffic flow over a network segment based on the aggregated packet information,
the network segment including a portion of a network via which the traffic flow is transmitted;
generating, by the device, performance information identifying the network performance parameter, the traffic flow, and the network segment;
providing, by the device, the performance information;
modifying, by the device and based on the performance information, a configuration parameter of the network element,
the modified configuration parameter being to address a discrepancy between the first information and the second information, and
the modified configuration parameter including at least one of:
an adjusted queue length for at least one of the plurality of queues associated with the network element, or
an adjusted queue weight for at least one of the plurality of queues associated with the network element; and
transmitting, by the device and to the network element, information associated with the modified configuration parameter.

15. The method of claim 14, where, when generating the performance information, the method includes:
compressing the network performance parameter.

16. The method of claim 14, further comprising:
determining that the network performance parameter satisfies a threshold,
and
when modifying the configuration parameter, the method includes:
modifying the configuration parameter based on determining that the network performance parameter satisfies the threshold.

17. The method of claim 14, where, when aggregating the packet information, the method includes:
aggregating the packet information based on at least one of:
a traffic identifier identifying the traffic flow associated with the packet information;
a network segment identifier identifying the network segment associated with the packet information;
a timestamp associated with the packet information; or
a packet identifier identifying the packet associated with the packet information.

18. The method of claim 14, where, when providing the performance information, the method includes:
providing the performance information to an analytics device; and
receiving, from the analytics device, a configuration adjustment associated with the network element based on the provided performance information,
when modifying the configuration parameter, the method includes:
modifying the configuration parameter based on the received configuration adjustment.

19. The method of claim 14, where the network performance parameter includes a balance factor that indicates an extent to which the plurality of queues are aligned with a network traffic pattern.

20. The method of claim 19, where the balance factor is determined based on the respective queue weight of the plurality of queues measured as a ratio determined from comparing a respective queue size of the plurality of queues,
the respective queue weight being based on a relative number of packets queued by each of the plurality of queues.

* * * * *